United States Patent Office 2,991,223
Patented July 4, 1961

2,991,223
3α,11β DIHYDROXY-11α-LOWER ALKYL-5β-PREGNAN-20-ONE 3-HEMISUCCINATE, ITS SALTS, AND BUFFERED PREPARATION THEREOF
Gunther S. Fonken, Kalamazoo, Mich., assignor to The Upjohn Company, Kalamazoo, Mich., a corporation of Delaware
No Drawing. Filed May 13, 1959, Ser. No. 812,815
4 Claims. (Cl. 167—52)

This invention relates to novel steroid compounds and, more particularly, to 3α,11β-dihydroxy-11α-lower-alkyl-5β-pregnan-20-one 3-hemisuccinate and alkali metal salts thereof.

This application is a continuation-in-part of copending application Serial No. 661,036, filed May 23, 1957, now Patent No. 2,944,069.

The compounds of this invention are useful for their sedative and analgetic properties as well as in the treatment of hypertension, nervous disorders and related illnesses and are characterized by pronounced central nervous system depressant activity. Because of the water solubility of the said compounds their high potency can be utilized efficaciously by intravenous or intramuscular administration to afford an early response in the patient and to provide a means for treating patients incapable of accepting medication by the oral route.

The preparation of the novel compounds of this invention can be represented in the following sequence of reactions:

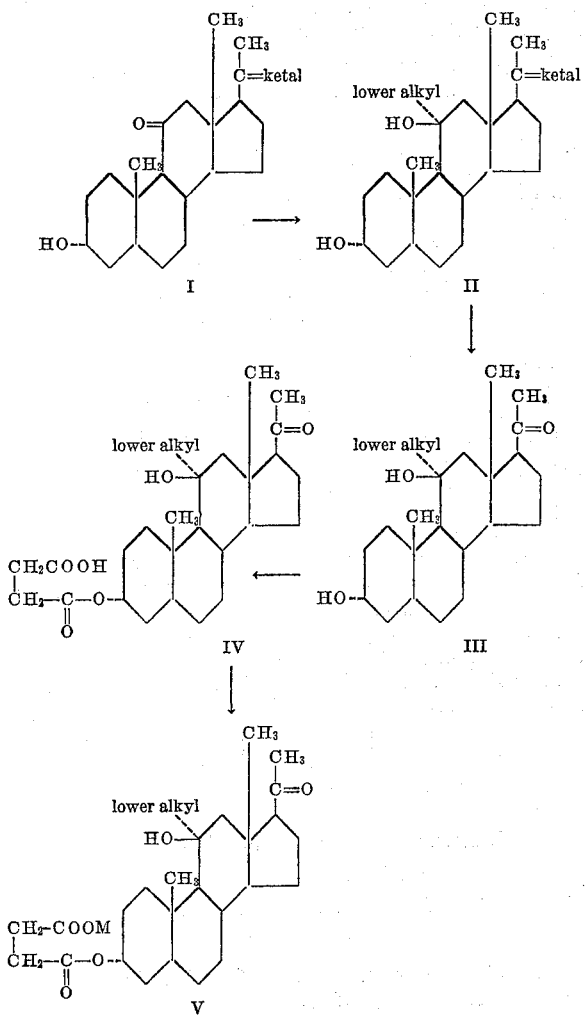

wherein, the lower alkyl radical contains from one to eight carbon atoms, inclusive, e.g., methyl, ethyl, propyl, butyl, pentyl, hexyl, isohexyl, heptyl, octyl, isoheptyl, etc., and M is an alkali metal, such as sodium, potassium, lithium, and the like.

The novel 3α,11β-dihydroxy-11α-lower-alkyl-5β-pregnan-20-one 3-hemisuccinate can be prepared by alkylating 3α-hydroxy-5β-pregnane-11,20-dione 20-ketal (I) [J. Org. Chem. 17:290 (1952)] with an alkyl metal compound to give 3α,11β-dihydroxy-11α-lower-alkyl-5β-pregnan-20-one 20-ketal (II). The said 20-ketal is then hydrolyzed to produce 3α,11β-dihydroxy - 11α - lower-alkyl-5β-pregnan-20-one (III), which is then reacted with succinic anhydride to yield 3α,11β-dihydroxy-11α-lower-alkyl-5β-pregnan-20-one 3-hemisuccinate (IV). The alkali metal salts of the said 3-hemisuccinate are then prepared by neutralization with the appropriate base.

The starting 3α-hydroxy-5β-pregnane-11,20-dione 20-ethylene-ketal (I) can be obtained according to the preparation disclosed by Rosenkranz et al., J. Org. Chem. 17:290 (1952).

The alkylation step of the present process, i.e., the conversion of the starting 11-keto compound (I) to the 11α-lower-alkyl-11β-hydroxy compound (II), is accomplished by reaction of the starting 3α-hydroxy-5β-pregnane-11,20-dione 20-ketal (I) with a lower alkyllithium, e.g., methyl, ethyl, propyl, butyl, isobutyl, amyl, hexyl, heptyl, octyl, etc. lithium, with methyllithium being preferred. The usual prior art reaction conditions for alkylation of a carbonyl group with an alkyllithium can be employed. Normally the present alkylation is carried out at about room temperature, i.e., between about 15–35° C., without heating or cooling. However, the process is operative at somewhat higher and lower temperatures. The intermediate 11α-lower-alkyl-11β-hydroxy-lithium complex is decomposed with water, acid, methanol, ethanol, etc., according to known methods, to produce the desired 3α,11β-dihydroxy-11α-lower-alkyl - 5β - pregnan-20-one 20-ketal (II).

The hydrolysis step of the present process involves the cleavage of the 20-ketal steroid to regenerate 3α,11β-dihydroxy-11α-lower-alkyl-5β-pregnan-20-one (III). The ketal is dissolved in an organic solvent, and the resulting solution is admixed with at least a theoretical amount, and preferably an excess, of water or an acid as the hydrolyzing agent. The organic solvent is preferably of the water-miscible type, such as acetone, methanol, ethanol, dioxane, etc. Ordinarily, it is preferred that a temperature of about 20–40° C. be employed for the reaction, but temperatures as low as zero and as high as 100° C. are operative. The time required for the reaction can be varied between about 1–24 hours, depending on the temperature and hydrolyzing agent employed. Likewise, the amount of acid can be varied over a wide range, amounts from a trace to a large excess being operative. Suitable hydrolyzing agents include strong acids such as, for example, sulfuric acid, hydrochloric acid, ortho- or para-toluenesulfonic acid, naphthalenesulfonic acid, benzenesulfonic acid, ortho-chlorobenzenesulfonic acid, trichloroacetic acid, or the like, sulfuric acid or hydrochloric acid being preferred. The acid hydrolyzing agent is generally employed as a dilute aqueous solution, concentrations in the reaction mixture of about 0.1%–20% being preferred.

The 3α,11β-dihydroxy-11α-lower-alkyl-5β-pregnan-20-one 3-hemisuccinate (IV) is conveniently prepared by reaction of the said 3α,11β-dihydroxy-11α-lower-alkyl-5β-pregnan-20-one (III) with succinic anhydride in a mutual solvent such as pyridine or lutidine, permitting the reaction to proceed for several hours. The product ester is recovered from the reaction mixture, for example, by adding a precipitating agent to bring down the 3-hemisuccinate as the free-acid ester or a salt thereof. An aqueous solution of hydrochloric acid or other strong mineral acid can be used when pyridine or like organic bases are employed as the mutual solvent. Ordinarily it is sufficient to pour the reaction mixture slowly into an excess of dilute aqueous hydrochloric acid and then filter off the precipitated product. The product can then be further purified by crystallization from a polar solvent such as acetone, methyl ethyl ketone, ethanol, isopropanol, β-ethoxyethanol, ethyl acetate and mixtures of the same with Skellysolve B (hexane hydrocarbons), ether, and water where the resulting solvent system is homogeneous.

The thus-produced 3α,11β-dihydroxy-11α-lower-alkyl-5β-pregnan-20-one 3-hemisuccinate can then be converted to a salt by neutralization with the appropriate base. Suitable bases are the alkali metal hydroxides and carbonates, such as sodium, potassium or lithium hydroxide or carbonate. The free acid ester is dissolved in a volatile water-miscible solvent, such as acetone, and the solution neutralized by adding aqueous alkali or alcoholic alkali. Other suitable volatile water-miscible solvents include methanol, ethanol isopropanol. The solvents are then removed by vacuum distillation. Advantageously, the water can also be removed by lyophilization. Before lyophilization the water solution is filter-sterilized where a sterile produce is desired. A buffered preparation containing the alkali metal salts can be readily prepared by neutralizing the product to pH 7 with a buffering agent, such as trisodium phosphate dodecahydrate.

The examples which follow are illustrative of the process yielding the products of the present invention but are not to be construed as limiting the scope thereof.

*Example 1.—3α,11β-dihydroxy-11α-methyl-5β-pregnan-20-one 20-ethylene ketal* (II)

A solution of 13.6 gm. of 3α-hydroxy-5β-pregnane-11,20-dione 20-ethylene ketal (I) in 150 ml. of benzene and 100 ml. of ether was treated with 144 ml. of molar ethereal methyllithium at room temperature overnight. The resulting solution was washed twice with water, filtered through sodium sulfate, and evaporated to dryness at reduced pressure. Chromatographic separation yielded 3α,11β-dihydroxy-11α-methyl-5β-pregnan-20-one 20-ethylene ketal (II) as an oil.

If for the methyllithium employed above there is substituted another lower-alkyllithium, e.g., ethyl-, propyl-, butyl-, isobutyl-, amyl-, hexyl-, heptyl-, octyl-, etc., the corresponding 11-alkylated steroids are produced.

*Example 2.—3α,11β-dihydroxy-11α-methyl-5β-pregnan-20-one* (III)

The 3α,11β-dihydroxy-11α-methyl-5β-pregnan-20-one 20-ethylene ketal from Example 1 was dissolved in 200 ml. of methanol and treated with 10 ml. of 3 N sulfuric acid at room temperature for 28 hours. Addition of 200 ml. of water and cooling in a refrigerator overnight produced a gel which, on standing at room temperature, gave 6.74 gm. of crystalline solid melting at 149–168° C. Repeated recrystallization from acetone-Skellysolve B hexanes yielded 0.22 gm. of pure 3α,11β-dihydroxy-11α-methyl-5β-pregnan-20-one (III), melting at 184–186° C. and having $[\alpha]_D$ +111° (acetone).

*Analysis.*—Calcd. for $C_{22}H_{36}O_3$: C, 75.81; H, 10.41. Found: C, 75.43; H, 10.25.

Substitution of other 11-alkylated ketals, in which the alkyl group is lower alkyl as indicated in Example 1, as the starting material herein is productive of the corresponding 3α,11β-dihydroxy-11α-lower-alkyl-5β-pregnan-20-one.

*Example 3.—3α,11β-dihydroxy-11α-methyl-5β-pregnan-20-one 3-hemisuccinate* (IV)

A mixture of 6.6 gm. of 3α,11β-dihydroxy-11α-methyl-5β-pregnan-20-one (III), 6.6 gm. of succinic anhydride and 60 ml. of pyridine was refluxed for 21 hours and then poured over crushed ice. After the ice had melted, the product was recovered by filtration and washed with water, 1 N hydrochloric acid, and again with water to give 5.67 gm. of 3α,11β-dihydroxy-11α-methyl-5β-pregnan-20-one 3-hemisuccinate melting point 153–156° C. A sample was recrystallized several times from aqueous methanol to give a product melting at 156–159° C. and have $[\alpha]_D$ +104° (acetone).

*Analysis.*—Calcd. for $C_{26}H_{40}O_6$: C, 69.61; H, 8.99; sap. eq., 224.3. Found, C, 69.69; H, 8.96; sap. eq. 227.2.

Substitution of other 11-alkylated starting materials, in which the alkyl group is lower alkyl as indicated in Example 1, is productive of the corresponding 3α,11β-dihydroxy-11α-lower-alkyl - 5β - pregnan-20-one 3-hemisuccinate.

*Example 4.—Sodium 3α,11β-dihydroxy-11α-methyl-5β-pregnan-20-one 3-succinate* (V)

A mixture is prepared by warming 5.0 gm. of 3α,11β-dihydroxy-11α-methyl-5β-pregnan-20-one 3-hemisuccinate (IV) in 20 ml. of acetone and cooling to room temperature. With continuous stirring, 20 ml. of 0.5 N aqueous sodium hydroxide is added gradually over a period of 10 minutes. The pH is maintained below 7.5, and the end point adjustment is made by adding in divided portions 0.5 N aqueous sodium hydroxide until a pH of 7.2–7.4 is obtained. The reaction mixture is then concentrated to about 25 ml. in an atmosphere of nitrogen and under vacuum. The pot temperature should not exceed about 26° C. The concentrate is then treated with 2 gm. of diatomaceous earth, filter sterilized and lyophilized to give essentially pure sodium 3α,11β-dihydroxy-11α-methyl-5β-pregnan-20-one 3-succinate.

Substitution of other 11-alkylated hemisuccinates, in which the alkyl group is lower alkyl as indicated in Example 1, for the starting material herein is productive of the corresponding 3α,11β-dihydroxy-11α-lower-alkyl-5β-pregnan-20-one 3-succinate.

*Example 5.—Buffered sodium 3α,11β-dihydroxy-11α-methyl-5β-pregnan-20-one 3-succinate*

A mixture is prepared by mixing 5.2 gm. of 3α,11β-dihydroxy-11α-methyl-5β-pregnan-20-one 3-hemisuccinate and 3.1 gm. of trisodium phosphate dodecahydrate in 100 ml. of water for 30 minutes. The resulting mixture is sterilized by filtration through a Seitz filter and lyophilized to give 7.0 gm. of a sterile, flufly solid comprising a mixture of sodium 3α,11β-dihydroxy-11α-methyl-5β-pregnan-20-one 3-succinate, disodium hydrogen phosphate and sodium dihydrogen phosphate. This material can then be reconstituted with sterile aqueous diluent for intravenous or intramuscular use.

It is to be understood that the invention is not to be limited to the exact details of operation or exact compounds shown and described, as obvious modifications and equivalents will be apparent to one skilled in the art; the invention is therefore to be limited only by the scope of the appended claims.

What is claimed is:

1. A compound selected from the group consisting of 3α,11β - dihydroxy-11α-lower-alkyl-5β-pregnan-20-one 3-hemisuccinate and the alkali metal salts thereof.

2. 3α,11β-dihydroxy - 11α - methyl-5β-pregnan-20-one 3-hemisuccinate.

3. Sodium 3α,11β - dihydroxy-11α-methyl-5β-pregnan-20-one 3-hemisuccinate.

4. A coprecipitated combination comprising 3α,11β-dihydroxy-11α-methyl-5β-pregnan-20-one 3-hemisuccinate neutralized to pH 7 with trisodium phosphate dodecahydrate.

References Cited in the file of this patent
UNITED STATES PATENTS 2,871,160     Johnson _____ Jan. 27, 1959

OTHER REFERENCES

Federal Register, p. 9516, 21 C.R.F. S121.100, 167/65MU (December 9, 1958).